US012763875B2

(12) United States Patent
Gupta et al.

(10) Patent No.: US 12,763,875 B2
(45) Date of Patent: Oct. 13, 2026

(54) SPIKING NEURAL NETWORKS FOR WIRELESS SIGNAL DECODING AND ENCODING

(71) Applicant: VIAVI Solutions Inc., Chandler, AZ (US)

(72) Inventors: Ankit Gupta, Welwyn Garden City (GB); Onur Dizdar, London (GB); Stephen Wang, London (GB)

(73) Assignee: VIAVI Solutions Inc., Chandler, AZ (US)

( * ) Notice: Subject to any disclaimer, the term of this patent is extended or adjusted under 35 U.S.C. 154(b) by 17 days.

(21) Appl. No.: 18/778,774

(22) Filed: Jul. 19, 2024

(65) Prior Publication Data

US 2026/0025227 A1 Jan. 22, 2026

(51) Int. Cl.
*H04L 1/00* (2006.01)
*G06N 3/0455* (2023.01)

(52) U.S. Cl.
CPC ........... *H04L 1/005* (2013.01); *G06N 3/0455* (2023.01)

(58) Field of Classification Search
CPC .............................. H04L 1/005; G06N 3/0455
See application file for complete search history.

(56) References Cited

U.S. PATENT DOCUMENTS

| | | | | |
|---|---|---|---|---|
| 2013/0297541 A1* | 11/2013 | Piekniewski | G06N 3/088 706/26 |
| 2017/0024644 A1* | 1/2017 | Van Der Made | G06N 3/063 |
| 2021/0056383 A1* | 2/2021 | Nishi | G06N 3/047 |
| 2022/0077957 A1* | 3/2022 | Jeon | G06N 3/09 |
| 2022/0278755 A1* | 9/2022 | Lee | H04L 27/233 |
| 2022/0278769 A1* | 9/2022 | Vankayala | G06F 18/214 |
| 2023/0162041 A1* | 5/2023 | Zhu | G06N 3/09 706/25 |
| 2023/0214634 A1* | 7/2023 | Han | G06N 3/04 706/15 |
| 2023/0325001 A1* | 10/2023 | Gigie | G01S 15/876 345/156 |
| 2025/0390723 A1* | 12/2025 | Fortkort | G06N 3/049 |

OTHER PUBLICATIONS

Chen, J., et al., "Neuromorphic Wireless Cognition: Event-Driven Semantic Communications for Remote Inference", arXiv:2206.06047v2, Jan. 8, 2023, pp. 1-30.
Extended European Search Report for Application No. EP25186440.1, mailed on Nov. 21, 2025, 9 pages.
Fang, W., et al., "Deep Residual Learning in Spiking Neural Networks", arXiv:2012.04159v5, Dec. 7, 2021, pp. 1-18.
Gupta, A., et al., "SpikingRx: From Neural to Spiking Receiver", arXiv:2409.05610v1, Sep. 9, 2024, pp. 1-12.
Honkala, M., et al., "DeepRx: Fully Convolutional Deep Learning Receiver", arXiv.2005.01494v2, Jan. 12, 2021, pp. 1-32.

* cited by examiner

*Primary Examiner* — Joseph D Torres
(74) *Attorney, Agent, or Firm* — Harrity & Harrity, LLP

(57) ABSTRACT

A wireless signal decoder may include a receiver configured to receive a wireless signal and convert the wireless signal into a digital signal. The wireless signal decoder may further include a processor configured to input the digital signal into a spiking neural network (SNN) and receive at least one predicted data symbol as output from the SNN. The at least one predicted data symbol may include a rate coded output or a latency coded output.

7 Claims, 12 Drawing Sheets

SPIKING NEURAL NETWORKS FOR WIRELESS SIGNAL DECODING AND ENCODING

BACKGROUND

To communicate wirelessly, a transmitting device may convert a stream of bits into wireless signals (e.g., radio frequency (RF) signals). A receiving device may receive wireless signals from the transmitting device and convert the received wireless signals back into bits. The receiving device may use hard coding to map each data symbol (from the received wireless signals) to a '1' or a '0' or may use soft coding to map each data symbol (from the received wireless signals) to a log likelihood ratio (LLR) value.

SUMMARY

Some implementations described herein relate to a wireless signal decoder. The wireless signal decoder may include a receiver configured to receive a wireless signal and convert the wireless signal into a digital signal. The wireless signal decoder may include at least one processor configured to input the digital signal into a spiking neural network (SNN) and receive at least one predicted data symbol as output from the SNN. The at least one predicted data symbol may include a rate coded output or a latency coded output.

Some implementations described herein relate to a wireless communication system. The wireless communication system may include at least one first processor configured to input encoded information into a first SNN and receive a set of modulation symbols as output from the first SNN. The wireless communication system may include a transmitter configured to output a wireless signal based on the set of modulation symbols. The wireless communication system may include a receiver configured to receive the wireless signal and convert the wireless signal into a digital signal. The wireless communication system may include at least one second processor configured to input the digital signal into a second SNN and receive at least one prediction, associated with the encoded information, as output from the second SNN.

Some implementations described herein relate to a wireless signal decoder. The wireless signal decoder may include a receiver configured to receive a wireless signal and convert the wireless signal into a digital signal. The wireless signal decoder may include at least one processor configured to input the digital signal into an SNN and receive a set of bit probabilities as output from a final layer of the SNN. The final layer may include an accumulation function or an artificial neural network (ANN) layer.

DETAILED DESCRIPTION

The following detailed description of example implementations refers to the accompanying drawings. The same reference numbers in different drawings may identify the same or similar elements.

To communicate wirelessly, a transmitting device may convert a digital signal (e.g., representing a sequence of data symbols) into wireless signals (e.g., RF signals). A receiving device may receive wireless signals from the transmitting device and convert the received wireless signals into a digital signal. The receiving device may use hard decoding to decode the digital signal into a sequence of data symbols (e.g., a sequence of bits) or may use soft decoding to decode the digital signal into a sequence of probabilities (e.g., LLR values).

Decoding wireless signals consumes power and processing resources, and any errors in decoding that cannot be corrected (e.g., using error correction codes) may result in retransmissions. Retransmissions consume additional power and processing resources and increase network overhead and congestion.

ANNs may be used to improve decoding accuracy and thus reduce retransmissions. However, ANNs consume large amounts of power, processing resources, and memory space such that accuracy gains from ANNs are often overshadowed by increased computer resource consumption.

SNNs may be used for wireless signal decoding in place of ANNs. Some implementations described herein enable an SNN to generate a rate coded output or a latency coded output using a digital signal converted from a wireless signal. As a result, the SNN may improve decoding accuracy and thus reduce retransmissions. Additionally, the SNN conserves power, processing resources, and memory space as compared with ANNs.

Additionally, SNNs may be used for wireless signal encoding when trained jointly with SNNs for wireless signal decoding. For example, some implementations described herein enable a first SNN (at a transmitter) to generate a set of modulation symbols for encoded information and a second SNN (at a receiver) to predict the encoded information using a digital signal converted from a received wireless signal (e.g., from the transmitter). As a result, the first SNN (e.g., trained jointly with the second SNN) may provide greater flexibility in determining the set of modulation symbols (e.g., as compared with rules-based modulation), which may improve quality and reliability of communications with the receiver.

Figure 1:
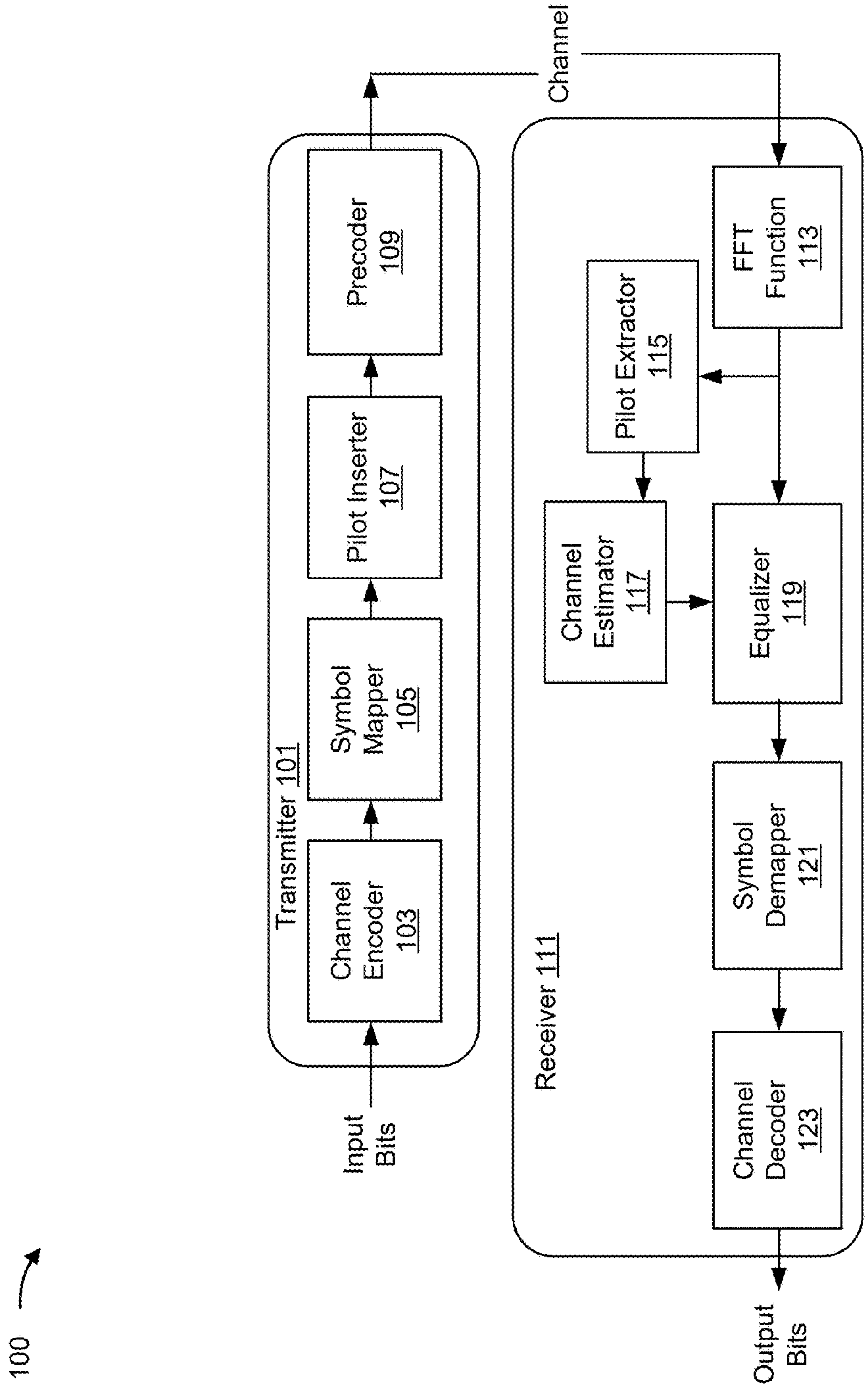
FIG. 1 is a diagram of an example implementation associated with wireless signal decoding and encoding.

FIG. 1 is a diagram of an example implementation 100 associated with wireless signal decoding and encoding. As shown in FIG. 1, example implementation 100 includes a transmitter 101 and a receiver 111. These devices are described in more detail below in connection with FIG. 8 and FIG. 9.

As shown in FIG. 1, the transmitter 101 passes a set of input bits through a channel encoder 103. The channel encoder 103 may use forward error correction (FEC) to add ECCs to the set of input bits (e.g., resulting in a set of coded bits). The transmitter 101 further includes a symbol mapper 105 that modulates the set of coded bits by complex baseband symbols (e.g., resulting in a sequence of symbols). In some implementations, the transmitter 101 includes a pilot inserter 107 that inserts pilot symbols (e.g., known to the receiver 111) at specific locations in the sequence of symbols. The transmitter 101 may also include a precoder 109 that applies precoding to the sequence of symbols. The transmitter 101 may apply an inverse fast Fourier transform (IFFT) function on precoded output (and optionally append a cyclic prefix (CP)) to result in time domain samples that are transmitted over-the-air by a set of antennas of the transmitter 101 as wireless signals (e.g., over a channel, as shown in FIG. 1).

Wireless signals are received over-the-air by a set of antennas of the receiver 111 (e.g., over the channel). The receiver 111 may remove the CP from the wireless signals and, as further shown in FIG. 1, may include a fast Fourier transform (FFT) function 113 that converts the wireless signals into frequency domain samples. For example, a frequency domain signal obtained by the receiver 111 may be represented as $$y_{mn} = h_{mn} x_{mn} + n_{mn},$$

where $x_{mn} \in \mathbb{C}$ represents a wireless signal from the transmitter 101, $y_{mn} \in \mathbb{C}$ represents a wireless signal at the receiver 111, $n_{mn} \in \mathbb{C}$ represents noise (e.g., additive white Gaussian noise (AWGN) with variance $N_0$, for $m \in \{0, \ldots, M-1\}$ and $n \in \{0, \ldots, N-1\}$), and $h_{mn} \in \mathbb{C}$ represents the channel between the transmitter 101 and the receiver 111 (or an effective channel between the transmitter 101 and the receiver 111, which is a multiplication of precoding and channel vectors).

The receiver 111 may further include a pilot extractor 115 that determines the pilot symbols and a channel estimator 117 that uses the pilot symbols to perform channel estimation over the pilot symbols. One example channel estimation algorithm is Least Squares (LS). For example, a channel estimate obtained by an LS algorithm (e.g., represented by $\hat{h}_{ij} \in \mathbb{C}$ and having an error variance represented by $$\sigma_{ij}^2$$

$\in \mathbb{R}$) may be represented as $$\hat{h}_{ij} = \frac{y_{ij} p_{ij}^*}{|p_{ij}|^2} = h_{ij} + \tilde{h}_{ij}, \text{ and}$$

$$\sigma_{in}^2 = \mathbb{E}\left[\tilde{h}_{ij} \tilde{h}_{ij}^*\right] = \frac{N_0}{|p_{ij}|^2},$$

where $\tilde{h}_{ij} \in \mathbb{C}$ represents an estimation error, $(\cdot)^*$ represents a conjugate operation, $y_{ij}$ represents the frequency domain signal, and $p_{ij}$ represents the pilot symbols.

The receiver 111 may use an interpolation mechanism to interpolate channel estimates and error variances in remaining symbols (e.g., orthogonal frequency-division multiplexed (OFDM) symbols) and OFDM subcarriers carrying data symbols. The receiver 111 may perform interpolation over time and/or frequency across pilot subcarriers. One example interpolation mechanism is a piecewise constant interpolation method that assumes the channel stays constant between two pilot locations. For example, if $k_1$ and $k_2$ represent two OFDM symbol indices carrying pilot symbols represented by $Q_P = k_2 - k_1$, channel estimates for remaining OFDM symbols (e.g., represented by $\hat{h}_{mn} \in \mathbb{C}$) may be represented as $$\hat{h}_{mn} = \mu_m \hat{h}_{k_1 n} + (1 - \mu_m) \hat{h}_{k_2 n},$$

where $\mu_m = m/Q_P$.

As further shown in FIG. 1, the receiver 111 may include an equalizer 119 that uses interpolated channel estimates to perform equalization on data symbols (e.g., represented by $y_{m'n} \in \mathbb{C}$, where $m' \in \{m \neq i\}$) to determine estimated data symbols (e.g., represented by $\hat{x}_{m'n} \in \mathbb{C}$). One example equalization is linear minimum mean square error (LMMSE) equalization, which may be represented as $$\hat{x}_{m'n} = \left((\hat{h}_{m'n})^H \hat{h}_{m'n} + \sigma_{m'}^2 I\right)(\hat{h}_{m'n})^H y_{m'n},$$

where I represents an identity matrix, $(\cdot)^H$ represents a Hermitian transpose operation, and $$\sigma_{m'}^2$$

represents an error variance for a data symbol with index m'.

The receiver 111 may further include a symbol demapper 121 that determines soft probabilistic outputs (e.g., LLRs). An LLR for the $l^{th} = 0, \ldots, B-1$ bit of a symbol, where B represents a total number of bits per symbol, may be represented as $$LLR_{m'n}^l = \ln\left(\frac{Pr(b^l = 1 \mid \hat{x}_{m'n}^l)}{Pr(b^l = 0 \mid \hat{x}_{m'n}^l)}\right) \approx \ln\left(\frac{\sum_{c \in C_{l,1}} \exp(-|\hat{x}_{m'n}^l - c|^2 / \sigma_{m'}^2)}{\sum_{c \in C_{l,0}} \exp(-|\hat{x}_{m'n}^l - c|^2 / \sigma_{m'}^2)}\right),$$

where $$Pr(b^l = 1 \mid \hat{x}_{m'n}^l)$$

represents a conditional probability that a given symbol $$\hat{x}_{m'n}^l$$

represents a transmitted bit of 1 (e.g., $b^l = 1$), and $\mathcal{C}_{l,1}$ represents a constellation point where the $l^{th}$ bit is equal to 1. The receiver 111 may include a channel decoder 123 that converts the soft probabilistic outputs from the symbol demapper 121 into a set of decoded bits. The channel decoder 123 may use the ECCs added by the channel encoder 103 in order to perform error correction and obtain the set of input bits from the transmitter 101.

As indicated above, FIG. 1 is provided as an example. Other examples may differ from what is described with regard to FIG. 1.

Figure 2:
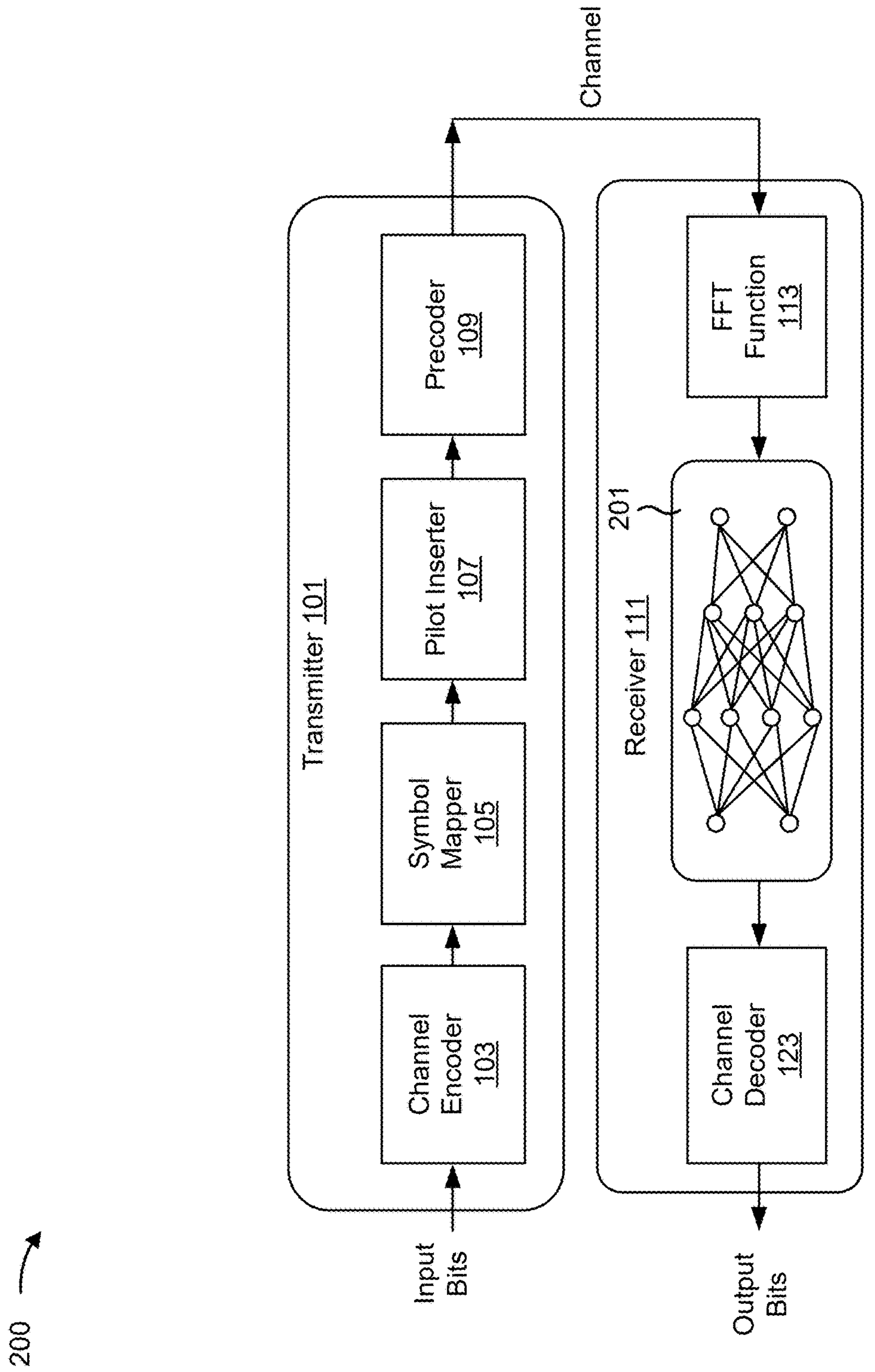
FIG. 2 is a diagram of an example implementation associated with using an SNN for wireless signal decoding.

FIG. 2 is a diagram of an example implementation 200 associated with using an SNN for wireless signal decoding. As shown in FIG. 2, example implementation 200 includes a transmitter 101 and a receiver 111. These devices are described in more detail below in connection with FIG. 8 and FIG. 9.

As shown in FIG. 2, the receiver 111 may use an SNN 201 to replace the channel estimator 117, the equalizer 119, and the symbol demapper 121. Therefore, the SNN 201 may accept a digital signal (e.g., a frequency domain sample from the FFT function 113) as input. In some implementations, the receiver 111 may still include the pilot extractor 115, and the SNN 201 may accept, as input, a resource grid of pilot values (e.g., represented by $P' \in \mathbb{C}^{M \times N}$) in addition to a resource grid of frequency domain values (e.g., represented by $Y \in \mathbb{C}^{M \times N}$). Alternatively, the SNN 201 may be pilotless, and the receiver 111 may lack the pilot extractor 115. The SNN 201 may output hard decision bits (e.g., rate coded output or latency coded output, as described in connection with FIG. 6), and thus the channel decoder 123 may perform error correction using only ECCs and not using LLRs (or the receiver 111 may lack the channel decoder 123 altogether). Alternatively, the SNN may output bit probabilities (e.g., LLRs, as described in connection with FIG. 7). Because the SNN 201 performs channel estimation and equalization in addition to symbol demapping, performance is improved as compared with using separate machine learning models to replace separate components of the receiver 111.

The SNN 201 may be trained for multiple generalizations. For example, the SNN 201 may be trained across different densities of wireless pilot signals (e.g., using training data with different amounts of pilot signals per frequency and/or time). Additionally, or alternatively, the SNN 201 may be trained across different channel conditions. For example, the SNN 201 may be trained using training data from different Third Generation Partnership Project (3GPP) channel models (e.g., for tapped delay line (TDL) models and/or clustered delay line (CDL) models, among other examples). Additionally, or alternatively, the SNN 201 may be trained across different delay spreads (e.g., using training data in a range of delay spreads, such as 10 nanoseconds (ns) to 300 ns). For example, the training data may include wireless signals with randomly sampled delay spreads. Additionally, or alternatively, the SNN 201 may be trained across different Doppler spreads (e.g., using training data in a range of Doppler spreads, such as 0 meters per second (m/s) to 5 m/s). For example, the training data may include wireless signals with randomly sampled Doppler spreads and/or randomly sampled velocities for the receiver 111. Additionally, or alternatively, the SNN 201 may be trained across different signal-to-noise ratios (SNRs). For example, the training data may include wireless signals with randomly sampled SNR values.

Because the SNN 201 includes neurons that have non-differentiable activation functions, the SNN 201 may not be trained using gradients of a loss function because the gradients are zero or infinity. This may be referred to as the "dead neuron problem." Therefore, surrogate gradient descent may be used to train the SNN 201. For example, a Heaviside operator (e.g., represented by U[t]) may be used in a forward pass to determine spikes for the SNN 201 and may be replaced by a continuous function (e.g., represented by S) during a backward propagation. For example, a derivative of the Heaviside operator may be replaced with a derivative of a threshold-shifted sigmoid function, which may be represented by $$\sigma(\cdot) = \frac{1}{1 + e^{\theta - U}}, \text{ such that}$$

$$\frac{\partial \tilde{S}}{\partial U} = \sigma'(\cdot) = \frac{e^{\theta - U}}{\left(e^{\theta - U} + 1\right)^2}.$$

The SNN 201 may also be configured for quantized representations rather than (higher precision) fixed-point representations in order to further reduce computational costs. For example, weights of bias terms of the SNN 201 may use quantized representations to reduce latency, memory overhead, power consumption, and processing resource cost. In order to reduce computational costs during training of the SNN 201 as well as application of the SNN 201, and to increase accuracy of the SNN 201, quantization may be performed during training of the SNN 201. For example, quantized values may be used during a forward pass through the SNN 201 during training. However, full precision weights may be used during a backward pass (e.g., using Hinton's straight-through-estimator method, among other examples) because quantized weights are non-differentiable. After training, the weights of the SNN 201 remain quantized, and states of spiking neurons in the SNN 201 are quantized as well.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
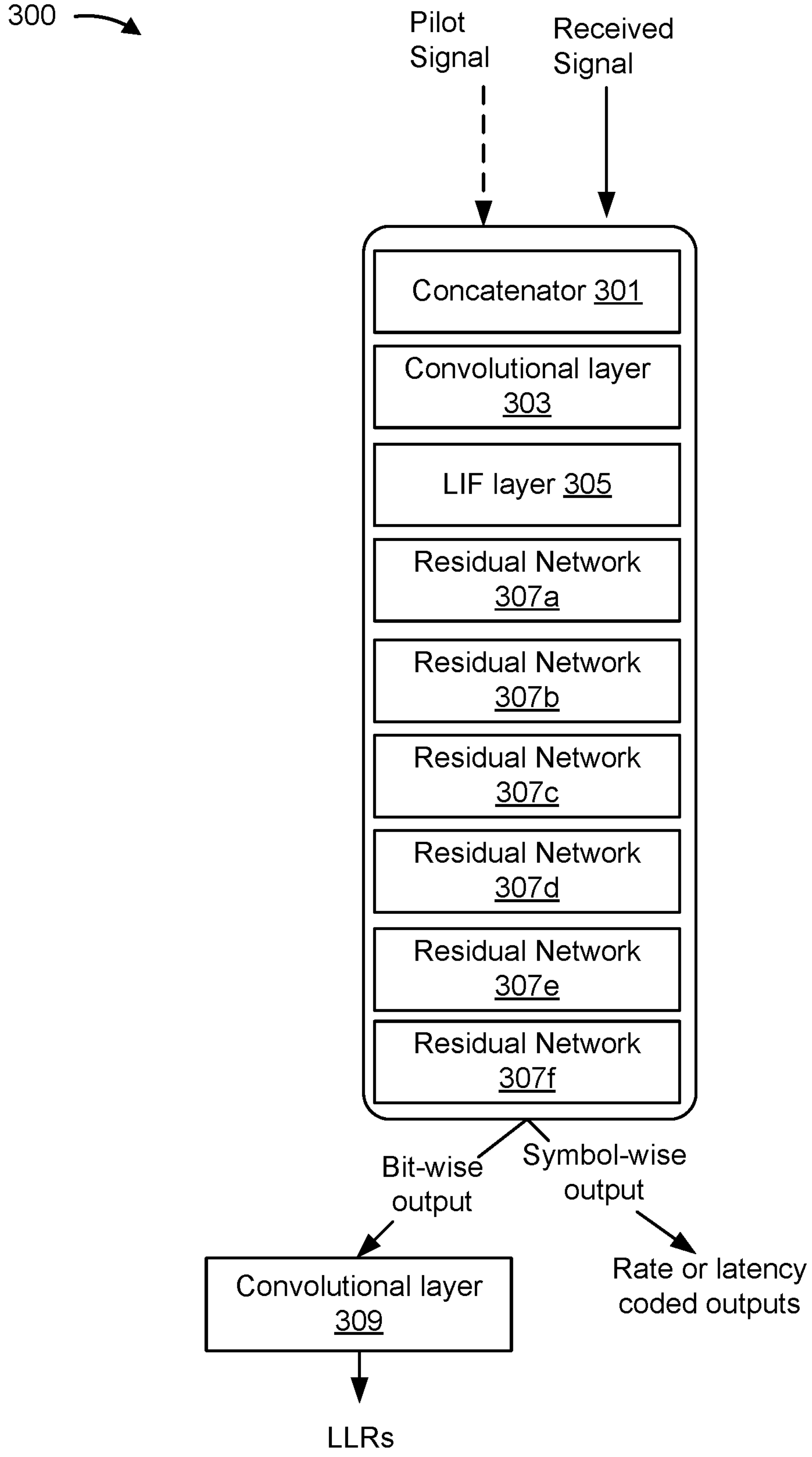
FIG. 3 is a diagram of an example SNN architecture associated with wireless signal decoding.

FIG. 3 is a diagram of an example SNN architecture 300 for wireless signal decoding. The example SNN architecture 300 may be implemented by a receiver 111, which is described in more detail below in connection with FIG. 8 and FIG. 9.

As shown in FIG. 3, the example SNN architecture 300 may include a concatenator 301 that receives input (e.g., a received signal at the receiver 111, such as a digital signal converted from a wireless signal, and optionally a pilot signal extracted from the received signal). The example SNN architecture 300 may further include a convolutional layer 303 and a leaky activate-and-fire (LIF) layer 305, which are trained to learn correlation in time and frequency domains for wireless signals. Finally, the example SNN architecture 300 may include a plurality of residual network (ResNet) layers, such as the six ResNet layers in FIG. 3 (e.g., layers 307*a*, 307*b* 307*c*, 307*d*, 307*e*, and 307*f*). Additional ResNet layers may be used to improve accuracy (but also increase performance cost). Each ResNet layer may include two-dimensional convolutional layers (e.g., to learn a channel associated with the wireless signals) or depthwise separable convolutional layers (e.g., to reduce overhead by operating on each channel independently).

Each ResNet layer may also use a spike-element-wise (SEW) ResNet layer, which moves a spiking neuron before an adding operation in the ResNet layer, such that output of the ResNet layer is spikes (e.g., bits rather than numerical values). Inputs of each ResNet layer (e.g., represented by I)

may be combined into outputs of each ResNet layer (e.g., represented by O) using, for example, an addition operation (e.g., represented by g=I+O), a logical AND operation (e.g., represented by g=I AND O), a logical IAND operation (e.g., represented by g=(1−I) AND O), and/or a logical OR operation (e.g., represented by g=(1−I) OR O). Other types of logical operations to combine inputs and outputs of the plurality of ResNet layers may be used. Additionally, the spiking neuron of each ResNet layer may be at an end of the layer (but still before the adding operation) rather than a beginning of the layer in order to further increase accuracy.

Training a model using the example SNN architecture 300 involves numerous design decisions. For example, beta and threshold values for the model may be fixed in order to further conserve computational resources during training (and without too much loss of accuracy). Additionally, or alternatively, timesteps for LIF neurons in the model may be selected to balance accuracy and computational cost (e.g., approximately 10 timesteps is one example). Similarly, activation functions for LIF neurons in the model may be selected to balance accuracy and performance (e.g., selecting from a recurrent leaky activation (RLeaky) function, a Leaky activation function, an alpha activation function, or a Laplicque activation function, among other examples). As described in connection with FIG. 2, surrogate gradient descents may be used for training. Accordingly, surrogate gradient descent functions may be selected to balance accuracy and performance (e.g., selecting from an arctangent (ArcTan) function, a Leaky spike operator (LSO) function, a sparse fast sigmoid (SFS) function, a stochastic spike operator (SSO) function, or a fast sigmoid function, among other examples). The ArcTan function may be represented by $$\frac{\partial \tilde{S}}{\partial U} = \frac{1}{\pi\left(1 + (\pi U)^2\right)}.$$

Finally, a learning rate may be selected to balance accuracy and performance. In some implementations, the example SNN architecture 300 may converge faster than ANN-based models, such that only 16000 epochs may be used for a 16 batch size. Accordingly, the example SNN architecture 300 may enable small learning rates, such as 0.0001, which improves performance over models with larger learning rates like 0.001.

As further shown in FIG. 3, the example SNN architecture 300 may generate symbol-wise output from the plurality of ResNet layers 307 (e.g., as described below in connection with FIG. 6). Alternatively, the example SNN architecture 300 may include a convolutional layer 309 (e.g., an ANN layer) that converts output from the plurality of ResNet layers 307 into bit probabilities (e.g., LLRs, as described below in connection with FIG. 7).

As indicated above, FIG. 3 is provided as an example. Other examples may differ from what is described with regard to FIG. 3.

Figure 4:
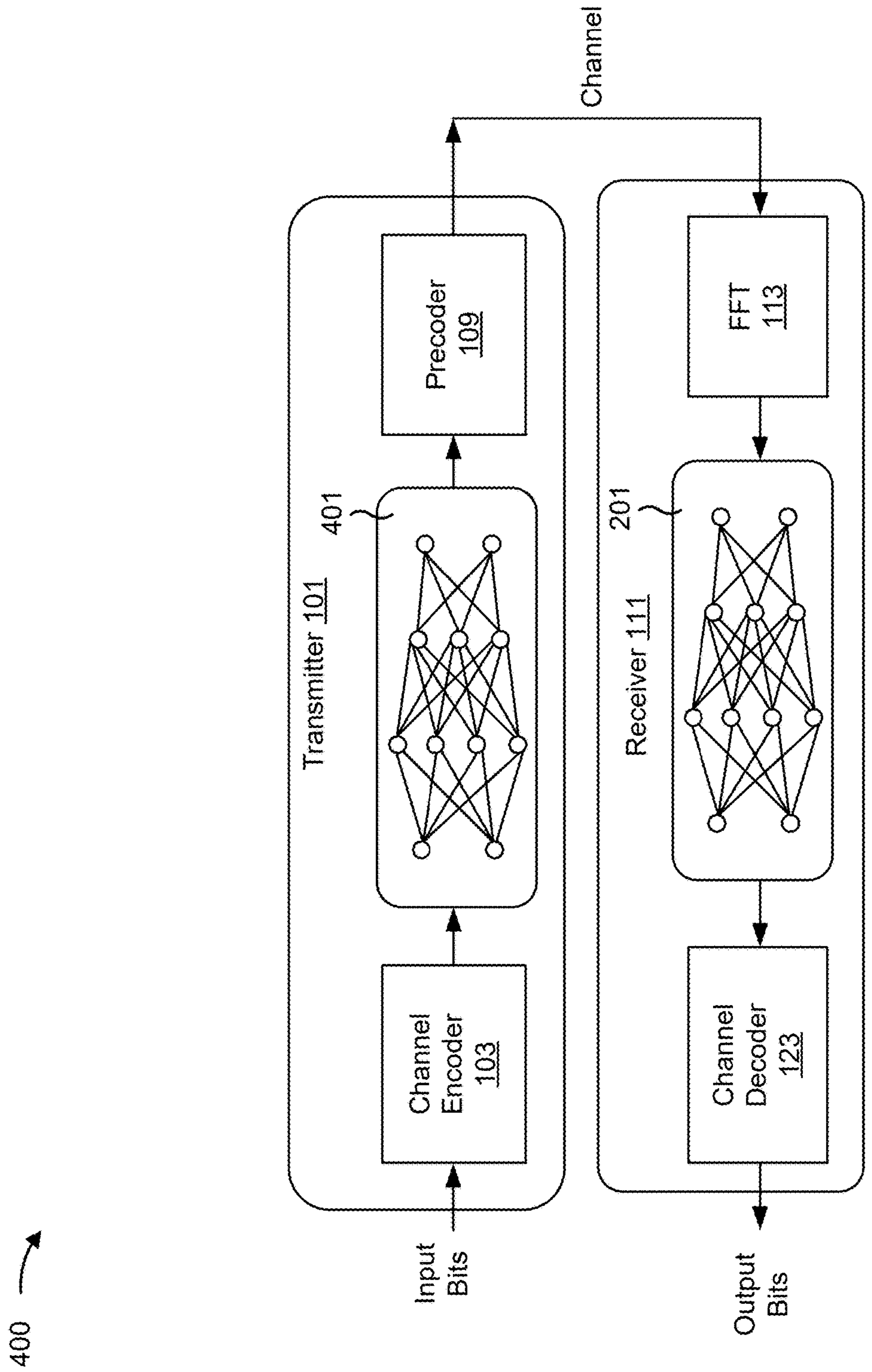
FIG. 4 is a diagram of an example implementation associated with using an SNN for wireless signal encoding and decoding.

FIG. 4 is a diagram of an example implementation 400 associated with using an SNN for wireless signal encoding and decoding. As shown in FIG. 4, example implementation 400 includes a transmitter 101 and a receiver 111. These devices are described in more detail below in connection with FIG. 8 and FIG. 9.

As shown in FIG. 4, the transmitter 101 may use an SNN 401 to replace the symbol mapper 105. Therefore, the SNN 401 may accept encoded information (e.g., a set of bits or a set of constellation symbols from the channel encoder 103) as input. In some implementations, the transmitter 101 may still include the pilot inserter 107. Alternatively, the SNN 201 at the receiver 111 may be pilotless, and the transmitter 101 may lack the pilot inserter 107. The SNN 401 may output a set of modulation symbols, and thus the precoder 109 may apply precoding to the set of modulation symbols. The transmitter 101 may apply IFFT on precoded output (and optionally append a CP) to result in time domain samples that are transmitted over-the-air by a set of antennas as wireless signals (e.g., over a channel, as shown in FIG. 4). Because the SNN 401 performs modulation, flexibility is increased as compared with using fixed modulation schemes at the transmitter 101.

In one example, the SNN 401 may enable custom phase-shift keying (PSK) modulation (e.g., as described in connection with FIG. 5A). In another example, the SNN 401 may enable custom quadrature amplitude modulation (QAM) (e.g., as described below in connection with FIG. 5B).

The SNN 401 may be trained jointly with the SNN 201. As a result, the SNN 201 at the receiver 111 may learn custom modulation that is being enabled by the SNN 401 at the transmitter 101.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5A:
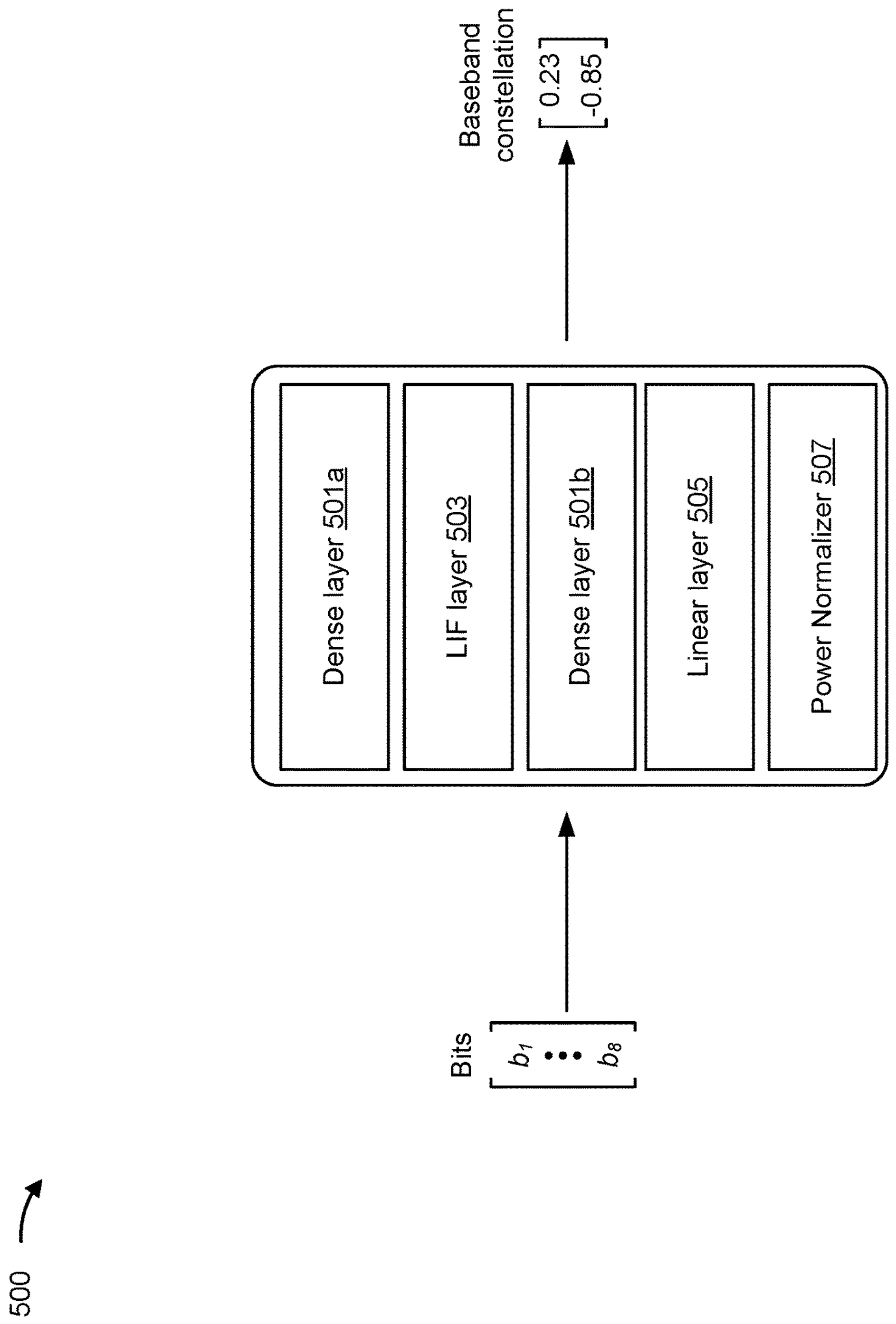
FIGS. 5A and 5B are diagrams of example SNN architectures associated with wireless signal encoding.
Figure 5B:
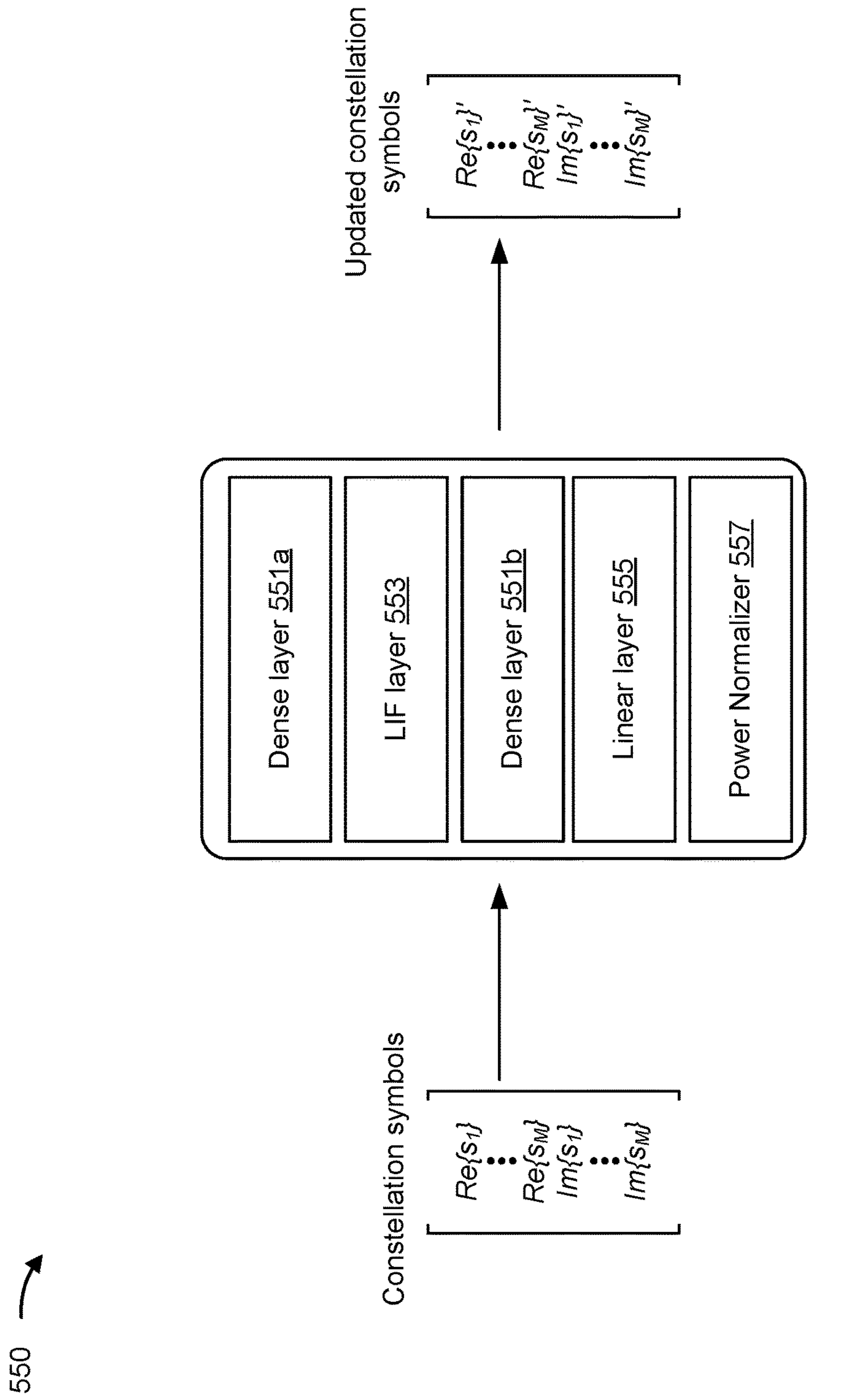

FIGS. 5A and 5B are diagrams of example SNN architectures 500 and 550, respectively, for wireless signal encoding. The example SNN architecture 500 or the example SNN architecture 550 may be implemented by a transmitter 101, which is described in more detail below in connection with FIG. 8 and FIG. 9.

The example SNN architecture 500 in FIG. 5A may enable custom PSK modulation. As shown in FIG. 5A, a set of bits (e.g., represented by B) are input, and a complex baseband signal (an in-phase and quadrature (I/Q) domain constellation diagram) may be output. For example, the example SNN architecture 500 may generate constellation symbols (e.g., represented by $\mathcal{M}=2^B$, where B represents a number of bits per symbol). The example SNN architecture 500 may generate real and imaginary parts of the complex baseband signal as separate outputs (e.g., because the example SNN architecture 500 may not generate complex values directly).

As further shown in FIG. 5A, the example SNN architecture 500 may include an LIF layer 503 surrounded by dense layers (and/or fully connected layers) 501*a* and 501*b*. The example SNN architecture 500 may further include a linear layer 505 in order to generate both positive and negative values for the complex baseband signal. A final layer in the example SNN architecture 500 may include a power normalizer 507 that normalizes an average power of a single constellation point to unity. By normalizing a power of each constellation symbol to one, modulation symbols output by the example SNN architecture 500 may form a circle (e.g., similarly to PSK modulation).

The example SNN architecture 550 in FIG. 5B may enable custom QAM. As shown in FIG. 5B, a set of constellation symbols (e.g., represented by $\mathcal{M}=2^B$) may be input, and a set of updated constellation symbols (e.g., $\mathcal{M}$ constellation symbols represented by $2\mathcal{M}$ real values) may be output. As shown in FIG. 5B, the example SNN architecture 550 may accept, as input, and may generate, as output, real and imaginary parts of constellations separately (e.g., because the example SNN architecture 550 may not generate complex values directly), shown as $\mathrm{Re}\{s_1\}$ through $\mathrm{Re}\{s_{\mathcal{M}}\}$ for real values and $\mathrm{Im}\{s_1\}$ through $\mathrm{Im}\{s_{\mathcal{M}}\}$ for imaginary values.

As further shown in FIG. 5B, the example SNN architecture 550 may include an LIF layer 553 surrounded by dense layers (and/or fully connected layers) 551*a* and 551*b*. The example SNN architecture 550 may further include a linear layer 555 in order to generate both positive and negative values for the set of constellation symbols. A final layer in the example SNN architecture 550 may include a power normalizer 557 that normalizes an average power of all constellation points to unity. By normalizing a power of all constellation points to one, modulation symbols output by the example SNN architecture 550 are more customizable than in PSK-like modulation schemes.

As indicated above, FIGS. 5A and 5B are provided as examples. Other examples may differ from what is described with regard to FIGS. 5A and 5B.

Figure 6:
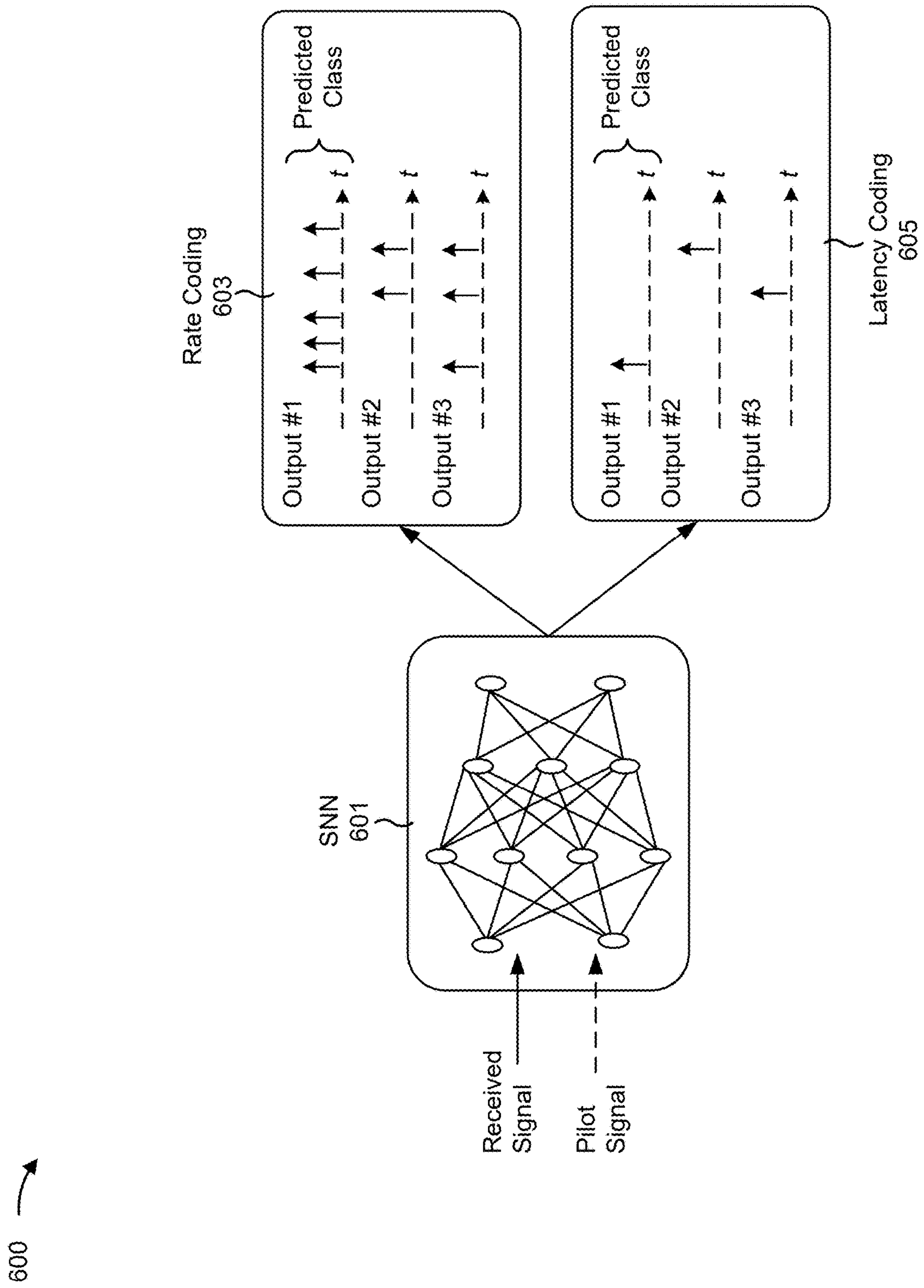
FIG. 6 is a diagram of an example SNN architecture associated with symbol-wise output.

FIG. 6 is a diagram of an example SNN architecture 600 for providing symbol-wise output. The example SNN architecture 600 may be implemented by a receiver 111, which is described in more detail below in connection with FIG. 8 and FIG. 9.

As shown in FIG. 6, an SNN 601 may accept, as input, a digital signal converted from a wireless signal (e.g., received at the receiver 111). In some implementations, the SNN 601 may further accept, as input, a wireless pilot signal (e.g., extracted from the wireless signal by the receiver 111). The SNN 601 may output a one-hot encoded vector representation of constellation symbols (e.g., represented by $\mathcal{M}=2^B$, where B represents a number of bits per symbol). For example, for quadrature phase-shift keying (QPSK) modulated bits with $\mathcal{M}=2^2=4$ constellation symbols, the SNN 601 may output a one-hot vector (e.g., represented by $1_s \in \{0, 1\}^{1\times 2^B}$), which may be a binary vector of which only one element is 1, thus denoting an index of a transmitted symbol (received by the receiver 111), and remaining elements are zeros. In other words, the SNN 601 may generate symbol-wise output as a solution to a multi-class classification problem.

As shown by reference number 603, output from the SNN 601 may be a rate coded output. In other words, a predicted symbol may be based on which neuron in the SNN 601 spikes most frequently (e.g., is associated with a highest spiking count). In order to ensure an equal spiking chance across neurons, each neuron in the SNN 601 may be stimulated for an equal amount of time. Using rate coding improves accuracy by increasing error tolerance and improving backpropagation convergence.

Additionally, or alternatively, as shown by reference number 605, output from the SNN 601 may be a latency coded output. In other words, a predicted symbol may be based on which neuron in the SNN 601 spikes first (e.g., earliest in time). Using latency coding (also referred to as temporal coding) reduces energy consumption and allows for simpler hardware implementation.

A combination of rate coding and latency coding may be referred to as population coding. For example, each class (e.g., each possible predicted symbol) may be associated with multiple neurons, and different combinations of neurons across classes may be used to generate a rate coded output or a latency coded output. The rate coded outputs and latency coded outputs may be combined to generate a final predicted symbol. Whether using rate coding and/or latency coding, the SNN 601 produces hard decision outputs (e.g., decoding a constellation symbol out of $\mathcal{M}$ possible symbols).

Training the SNN 601 may include a minimization of cross-entropy loss. In one example, the cross-entropy loss for rate coding may be represented by:

$$L_{CCE} = \sum_{l=0}^{\mathcal{M}-1} 1_S^l \log\left(\frac{e^{\vec{c}_l}}{\sum_{l=0}^{\mathcal{M}-1} e^{\vec{c}_l}}\right),$$

where $\hat{1_s}$ =arg max $\vec{c}$ represents a predicted class from the SNN 601, spikes generated for each class over time may be represented in a time-varying vector, $\vec{S}[t] \in \mathbb{R}^{\mathcal{M}\times T}$, and a spike count for the $l^{th}=0, \ldots, \mathcal{M}-1$ class over time T may be represented by $$\vec{c}_l = \sum_{t=0}^{T-1} \vec{S}_l[t].$$

In another example, the cross-entropy loss for rate coding may be represented by:

$$L_{CCE} = \sum_{l=0}^{\mathcal{M}-1} 1_S^l \log\left(\frac{e^{\vec{m}_l}}{\sum_{l=0}^{\mathcal{M}-1} e^{\vec{m}_l}}\right),$$

where $U[t] \in \mathbb{R}^{\mathcal{M}}$ represents a membrane potential over time, and $$\vec{m}_l = \max_t U_l[t]$$

represents a maximum membrane potential.

In one example, the cross-entropy loss for latency coding may be represented by $$L_{CCE} = \sum_{l=0}^{\mathcal{M}-1} 1_S^l \log\left(\frac{e^{\vec{f}_l}}{\sum_{l=0}^{\mathcal{M}-1} e^{\vec{f}_l}}\right),$$

where $\vec{f}_l \in \mathbb{R}^{\mathcal{M}}$ may represent a vector that contains each output layer neuron's initial spike timing and may be replaced according to $\vec{f}_l := -\vec{f}_l$ such that a value of a timing associated with a correct class is maximized correctly.

As indicated above, FIG. 6 is provided as an example. Other examples may differ from what is described with regard to FIG. 6.

Figure 7:
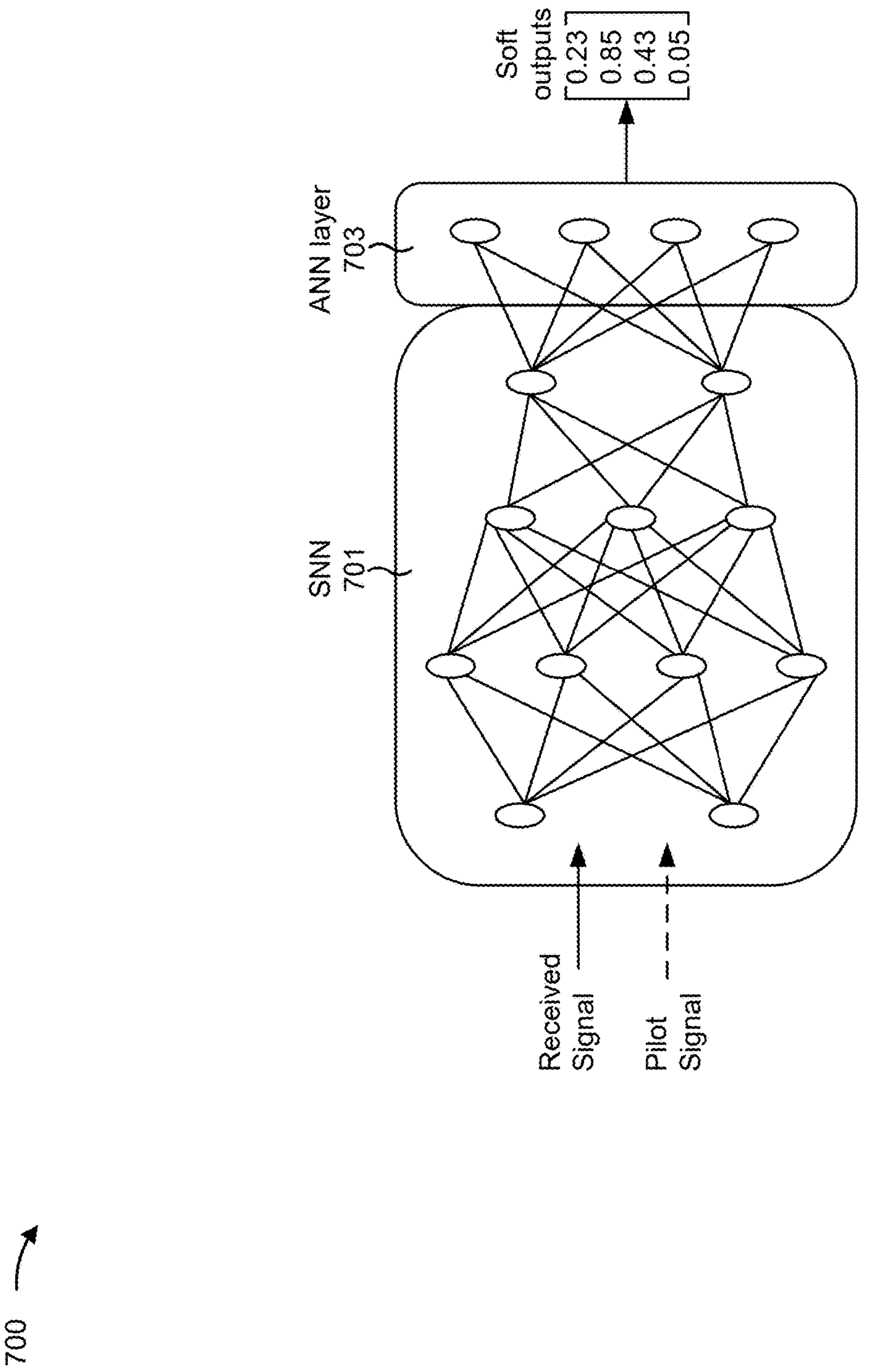
FIG. 7 is a diagram of an example SNN architecture associated with bit-wise output.

FIG. 7 is a diagram of an example SNN architecture 700 for providing bit-wise output. The example SNN architecture 700 may be implemented by a receiver 111, which is described in more detail below in connection with FIG. 8 and FIG. 9.

As shown in FIG. 7, an SNN 701 may accept, as input, a digital signal converted from a wireless signal (e.g., received at the receiver 111). In some implementations, the SNN 701 may further accept, as input, a wireless pilot signal (e.g., extracted from the wireless signal by the receiver 111). As further shown in FIG. 7, the SNN 701 may use an ANN layer 703 in order to generate soft outputs (e.g., bit probabilities, such as LLRs), represented by $\hat{b} \in [0, 1]^B$ for each bit) by using sigmoid activation. In one example, a last layer of the SNN 701 may generate logits (e.g., represented by $\hat{a}_l \in \mathbb{R}$), which may be passed through a sigmoid activation function (e.g., represented by $\sigma(x)=(1+e^{-x})^{-1}$) in the ANN layer 703 to generate soft probabilities (e.g., represented by $\tilde{p}(b_l|y_r)$ for the $l^{th}=0, \ldots, B-1$ class or bit). The soft probabilities may be associated to LLRs according to $$LLR_l := \log\left(\frac{1-\tilde{p}(b_l=0 \mid y_r)}{\tilde{p}(b_l=0 \mid y_r)}\right) = m_l,$$

where $\tilde{p}(b_l=1|y_r)=\sigma(m_l)$.

Alternatively, spikes generated for each class over time may be aggregated (e.g., using rate coding, as described in connection with FIG. 6) in a time-varying vector (e.g., represented by $\vec{S}[t] \in \mathbb{R}^{B\times T}$). A spike count for the $l^{th}=0, \ldots, B-1$ class or bit may be calculated using a mean of spikes over a period of duration T, represented by:

$$\vec{c_l} = \sum_{t=0}^{T-1} \vec{S_l}[t]/T,$$

such that soft outputs $\vec{c_l} \in [0, 1]$ may correspond to the $l^{th}=0, \ldots, B-1$ bit.

Training the SNN 601 may include a minimization of binary cross-entropy loss. In one example, the binary cross-entropy loss may be represented by:

$$L_{BCE} = \sum_{l=0}^{B-1} b_l \log(\tilde{p}(b_l \mid y_r)) + (1-b_l)\log(1-\tilde{p}(b_l \mid y_r)).$$

As indicated above, FIG. 7 is provided as an example. Other examples may differ from what is described with regard to FIG. 7.

Figure 8:
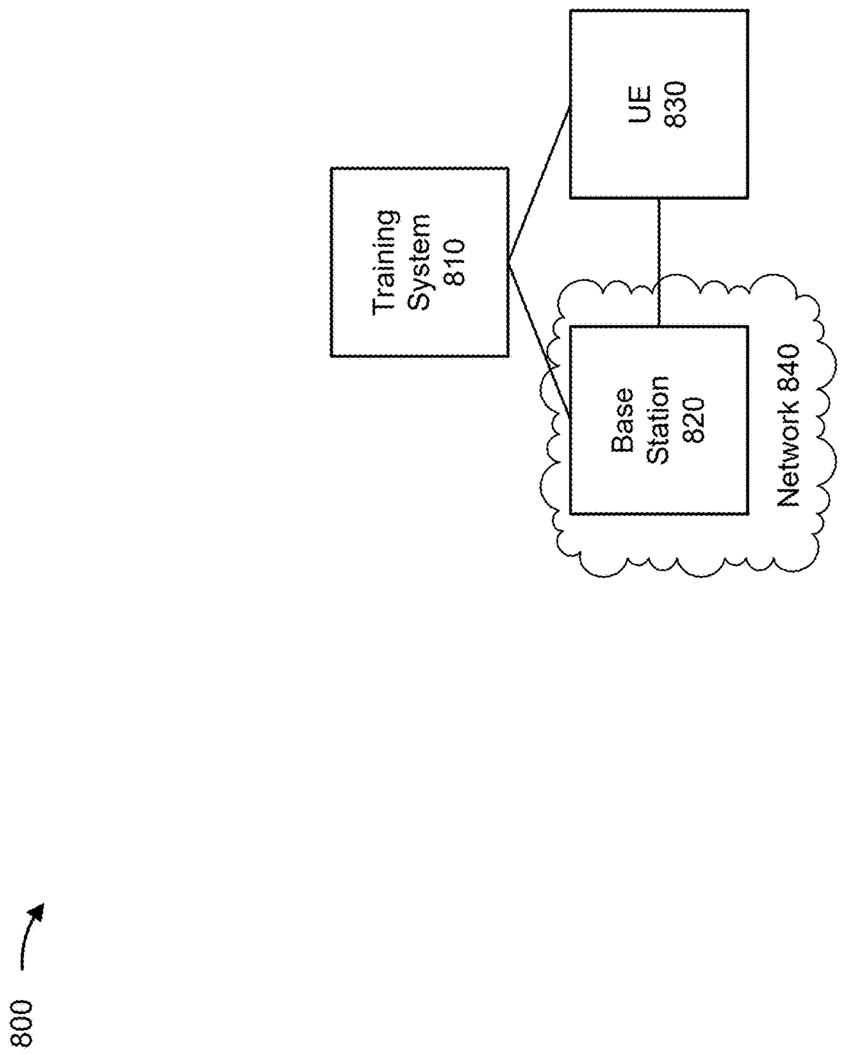
FIG. 8 is a diagram of an example environment in which systems and/or methods described herein may be implemented.

FIG. 8 is a diagram of an example environment 800 in which systems and/or methods described herein may be implemented. As shown in FIG. 8, environment 800 may include a training system 810, a base station 820, a user equipment (UE) 830, and a network 840. Devices of environment 800 may interconnect via wired connections, wireless connections, or a combination of wired and wireless connections.

The training system 810 includes one or more devices capable of communicating with the base station 820, the UE 830, and/or a network (e.g., the network 840), such as to train a model (e.g., an SNN) used by the base station 820 and/or by the UE 830. The training system 810 may communicate with the base station 820 and/or the UE 830 by a wired connection, as described elsewhere herein. In some implementations, the training system 810 may wirelessly communicate with the base station 820 and/or the UE 830.

The training system 810 may include a communication and/or computing device, such as a server, an application server, a client server, a web server, a database server, a host server, a proxy server, a virtual server (e.g., executing on computing hardware), a server in a cloud computing system, or a similar type of device. The training system 810 may train a model for wireless signal decoding and/or for wireless signal encoding, as described herein.

The base station 820 includes one or more devices capable of communicating with a UE using a cellular radio access technology (RAT). For example, the base station 820 may include a base transceiver station, a radio base station, a node B, an evolved node B (eNB), a gNB, a base station subsystem, a cellular site, a cellular tower (e.g., a cell phone tower or a mobile phone tower), an access point, a transmit receive point (TRP), a radio access node, a macrocell base station, a microcell base station, a picocell base station, a femtocell base station, or a similar type of device. The base station 820 may transfer traffic between a UE (e.g., using a cellular RAT), other base stations 820 (e.g., using a wireless interface or a backhaul interface, such as a wired backhaul interface), and/or the network 840. The base station 820 may provide one or more cells that cover geographic areas. Some base stations 820 may be mobile base stations. Some base stations 820 may be capable of communicating using multiple RATs.

In some implementations, the base station 820 may perform scheduling and/or resource management for UEs covered by the base station 820 (e.g., UEs covered by a cell provided by the base station 820). In some implementations, the base station 820 may be controlled or coordinated by a network controller, which may perform load balancing and/or network-level configuration. The network controller may communicate with the base station 820 via a wireless or wireline backhaul. In some implementations, the base station 820 may include a network controller, a self-organizing network (SON) module or component, or a similar module or component. In other words, the base station 820 may perform network control, scheduling, and/or network management functions (e.g., for other base stations 820 and/or for uplink, downlink, and/or sidelink communications of UEs covered by the base station 820). In some implementations, the base station 820 may include a central unit and multiple distributed units. The central unit may coordinate access control and communication with regard to the multiple distributed units. The multiple distributed units may provide UEs and/or other base stations 820 with access to the network 840. In some implementations, the base station 820 may be capable of multiple input multiple output (MIMO) communication (e.g., beamformed communication).

The UE 830 may include one or more devices capable of communicating with the base station 820 and/or a network (e.g., the network 840). For example, the UE 830 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. The UE 830 may be capable of communicating using uplink (e.g., UE to base station) communications, downlink (e.g., base station to UE) communications, and/or sidelink (e.g., UE-to-UE) communications. In some implementations, the UE 830 may include a machine-type communication (MTC) UE, such as an evolved or enhanced MTC (eMTC) UE. In some implementations, the UE 830 may include an Internet of Things (IoT) UE, such as a narrowband IoT (NB-IoT) UE.

The UE 830 may function as a "receiver" for downlink communications and as a "transmitter" for uplink communications. Similarly, the base station 820 may function as a "transmitter" for downlink communications and as a "receiver" for uplink communications. Other wireless transmitters and receivers may be used (e.g., Bluetooth® devices, WiFi® devices, among other examples) instead of the UE 830 and/or the base station 820.

The network 840 includes one or more wired and/or wireless networks. For example, the network 840 may include a cellular network (e.g., a long-term evolution (LTE) network, a code division multiple access (CDMA) network, a 3G network, a 4G network, a 5G network, or another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The quantity and arrangement of devices and networks shown in FIG. 8 are provided as one or more examples. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
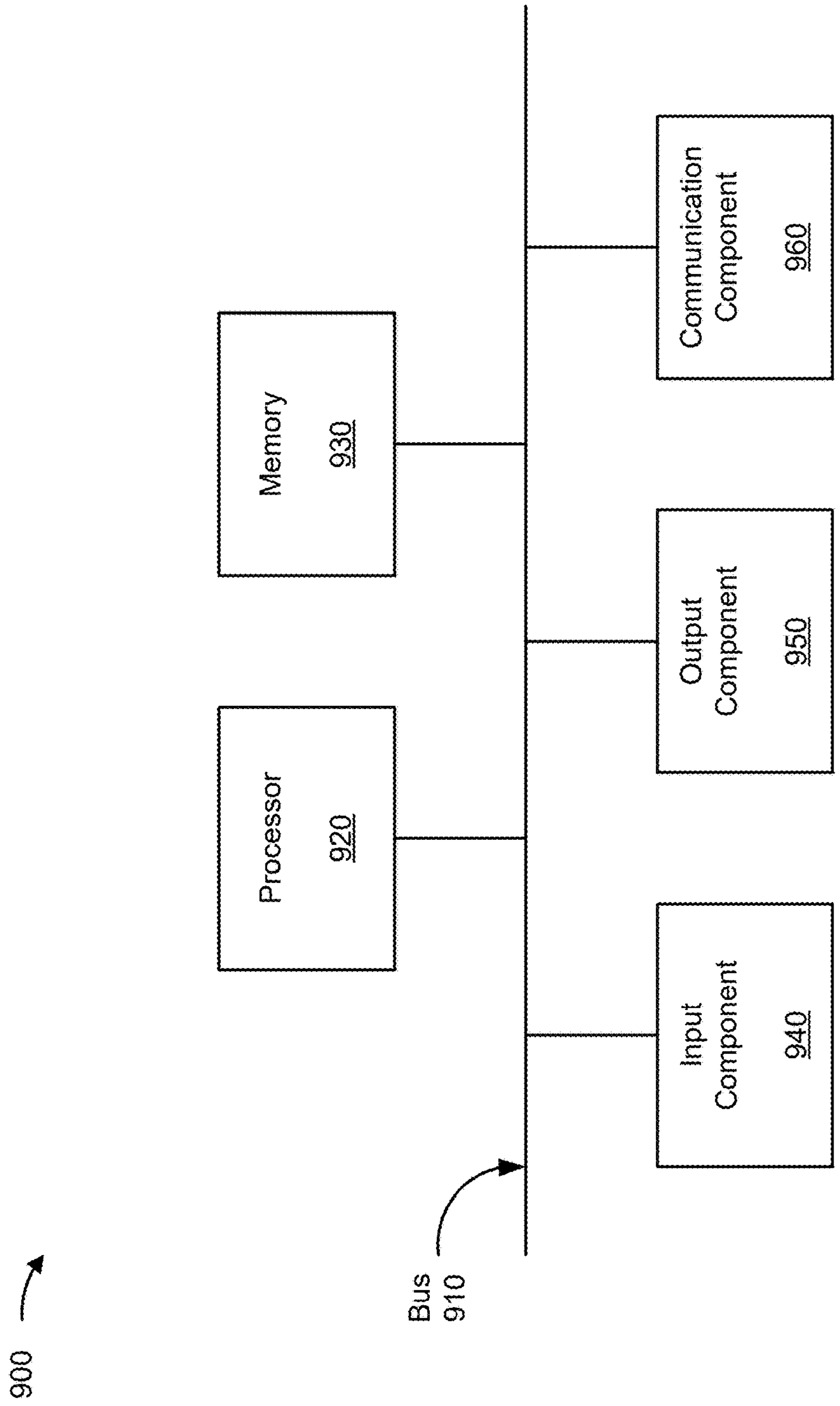
FIG. 9 is a diagram of example components of one or more devices of FIG. 8.

FIG. 9 is a diagram of example components of a device 900 associated with using SNNs for wireless signal decoding and encoding. The device 900 may correspond to a training system 810, a base station 820, and/or a UE 830. In some implementations, a training system 810, a base station 820, and/or a UE 830 may include one or more devices 900 and/or one or more components of the device 900. As shown in FIG. 9, the device 900 may include a bus 910, a processor 920, a memory 930, an input component 940, an output component 950, and/or a communication component 960.

The bus 910 may include one or more components that enable wired and/or wireless communication among the components of the device 900. The bus 910 may couple together two or more components of FIG. 9, such as via operative coupling, communicative coupling, electronic coupling, and/or electric coupling. For example, the bus 910 may include an electrical connection (e.g., a wire, a trace, and/or a lead) and/or a wireless bus. The processor 920 may include a central processing unit, a graphics processing unit, a microprocessor, a controller, a microcontroller, a digital signal processor, a field-programmable gate array, an application-specific integrated circuit, and/or another type of processing component. The processor 920 may be implemented in hardware, firmware, or a combination of hardware and software. In some implementations, the processor 920 may include one or more processors capable of being programmed to perform one or more operations or processes described elsewhere herein.

The memory 930 may include volatile and/or nonvolatile memory. For example, the memory 930 may include random access memory (RAM), read only memory (ROM), a hard disk drive, and/or another type of memory (e.g., a flash memory, a magnetic memory, and/or an optical memory). The memory 930 may include internal memory (e.g., RAM, ROM, or a hard disk drive) and/or removable memory (e.g., removable via a universal serial bus connection). The memory 930 may be a non-transitory computer-readable medium. The memory 930 may store information, one or more instructions, and/or software (e.g., one or more software applications) related to the operation of the device 900. In some implementations, the memory 930 may include one or more memories that are coupled (e.g., communicatively coupled) to one or more processors (e.g., processor 920), such as via the bus 910. Communicative coupling between a processor 920 and a memory 930 may enable the processor 920 to read and/or process information stored in the memory 930 and/or to store information in the memory 930.

The input component 940 may enable the device 900 to receive input, such as user input and/or sensed input. For example, the input component 940 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 950 may enable the device 900 to provide output, such as via a display, a speaker, and/or a light-emitting diode. The communication component 960 may enable the device 900 to communicate with other devices via a wired connection and/or a wireless connection. For example, the communication component 960 may include a receiver, a transmitter, a transceiver, a modem, a network interface card, and/or an antenna.

The device 900 may perform one or more operations or processes described herein. For example, a non-transitory computer-readable medium (e.g., memory 930) may store a set of instructions (e.g., one or more instructions or code) for execution by the processor 920. The processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry may be used instead of or in combination with the instructions to perform one or more operations or processes described herein. Additionally, or alternatively, the processor 920 may be configured to perform one or more operations or processes described herein. Thus, implementations described herein are not limited to any specific combination of hardware circuitry and software.

The number and arrangement of components shown in FIG. 9 are provided as an example. The device 900 may include additional components, fewer components, different components, or differently arranged components than those shown in FIG. 9. Additionally, or alternatively, a set of components (e.g., one or more components) of the device 900 may perform one or more functions described as being performed by another set of components of the device 900.

Figure 10:
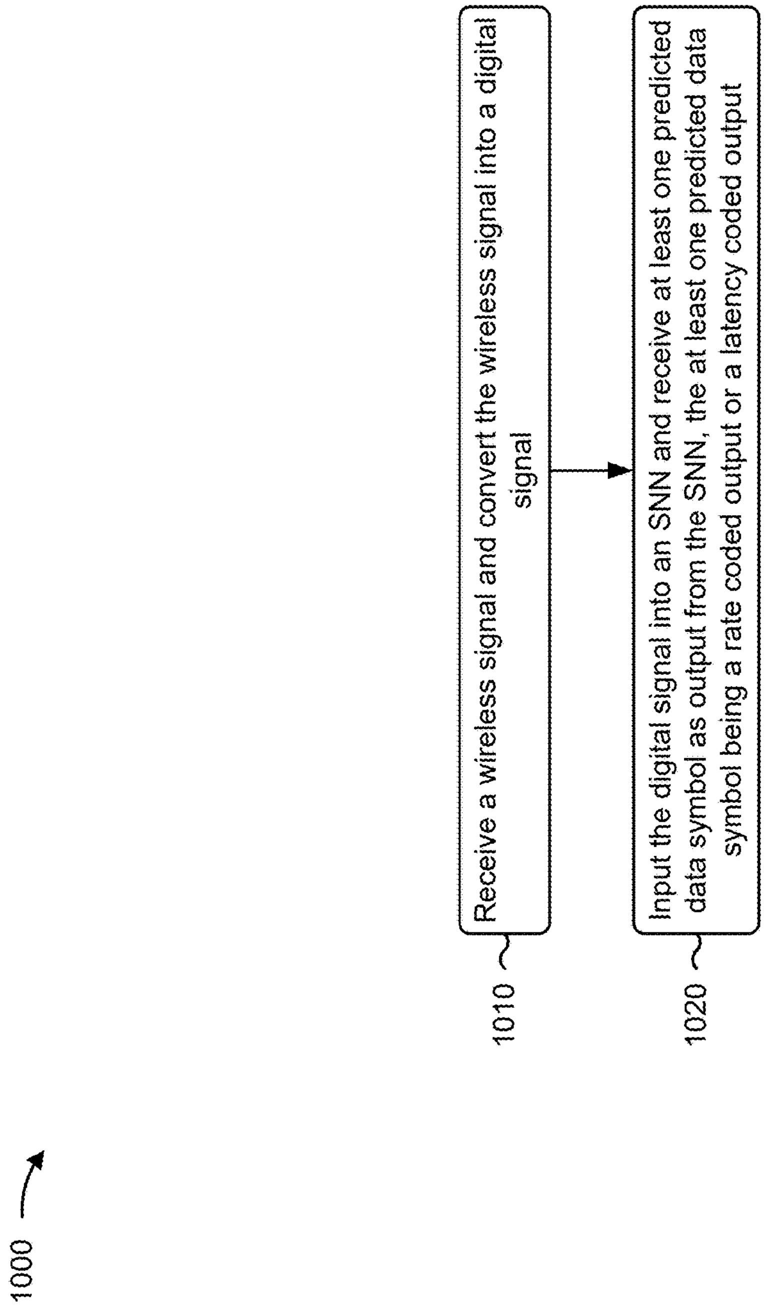
FIGS. 10 and 11 are flowcharts of example processes relating to using SNNs for wireless signal decoding.

FIG. 10 is a flowchart of an example process 1000 associated with using SNNs for wireless signal decoding. In some implementations, one or more process blocks of FIG. 10 are performed by a wireless signal decoder (e.g., a base station 820 or a UE 830). In some implementations, one or more process blocks of FIG. 10 are performed by another device or a group of devices separate from or including the wireless signal decoder, such as a training system 810. Additionally, or alternatively, one or more process blocks of FIG. 10 may be performed by one or more components of device 900, such as processor 920, memory 930, input component 940, output component 950, and/or communication component 960.

As shown in FIG. 10, process 1000 may include receiving a wireless signal and convert the wireless signal into a digital signal (block 1010). For example, the wireless signal decoder may receive a wireless signal and convert the wireless signal into a digital signal, as described herein.

As further shown in FIG. 10, process 1000 may include inputting the digital signal into an SNN and receiving at least one predicted data symbol as output from the SNN, the at least one predicted data symbol being a rate coded output or a latency coded output (block 1020). For example, the wireless signal decoder may input the digital signal into an SNN and receive at least one predicted data symbol as output from the SNN, the at least one predicted data symbol being a rate coded output or a latency coded output, as described herein.

Process 1000 may include additional implementations, such as any single implementation or any combination of implementations described below and/or in connection with one or more other processes described elsewhere herein.

In a first implementation, process 1000 includes receiving a wireless pilot signal, converting the wireless pilot signal into a digital pilot signal, and inputting the digital pilot signal into the SNN.

In a second implementation, alone or in combination with the first implementation, the at least one predicted data symbol includes a rate coded output, and the rate coded output is selected based on a classification associated with a largest spiking count in the SNN.

In a third implementation, alone or in combination with one or more of the first and second implementations, the at least one predicted data symbol includes a latency coded output, and the latency coded output is selected based on a classification associated with an earliest spiking neuron in the SNN.

In a fourth implementation, alone or in combination with one or more of the first through third implementations, the SNN is trained using categorical cross-entropy or a maximum membrane spike rate.

In a fifth implementation, alone or in combination with one or more of the first through fourth implementations, the digital signal includes a frequency domain signal derived using an FFT.

In a sixth implementation, alone or in combination with one or more of the first through fifth implementations, the SNN includes an input layer, a convolutional layer, a plurality of residual network blocks, and an output layer.

Although FIG. 10 shows example blocks of process 1000, in some implementations, process 1000 includes additional blocks, fewer blocks, different blocks, or differently arranged blocks than those depicted in FIG. 10. Additionally, or alternatively, two or more of the blocks of process 1000 may be performed in parallel.

Figure 11:
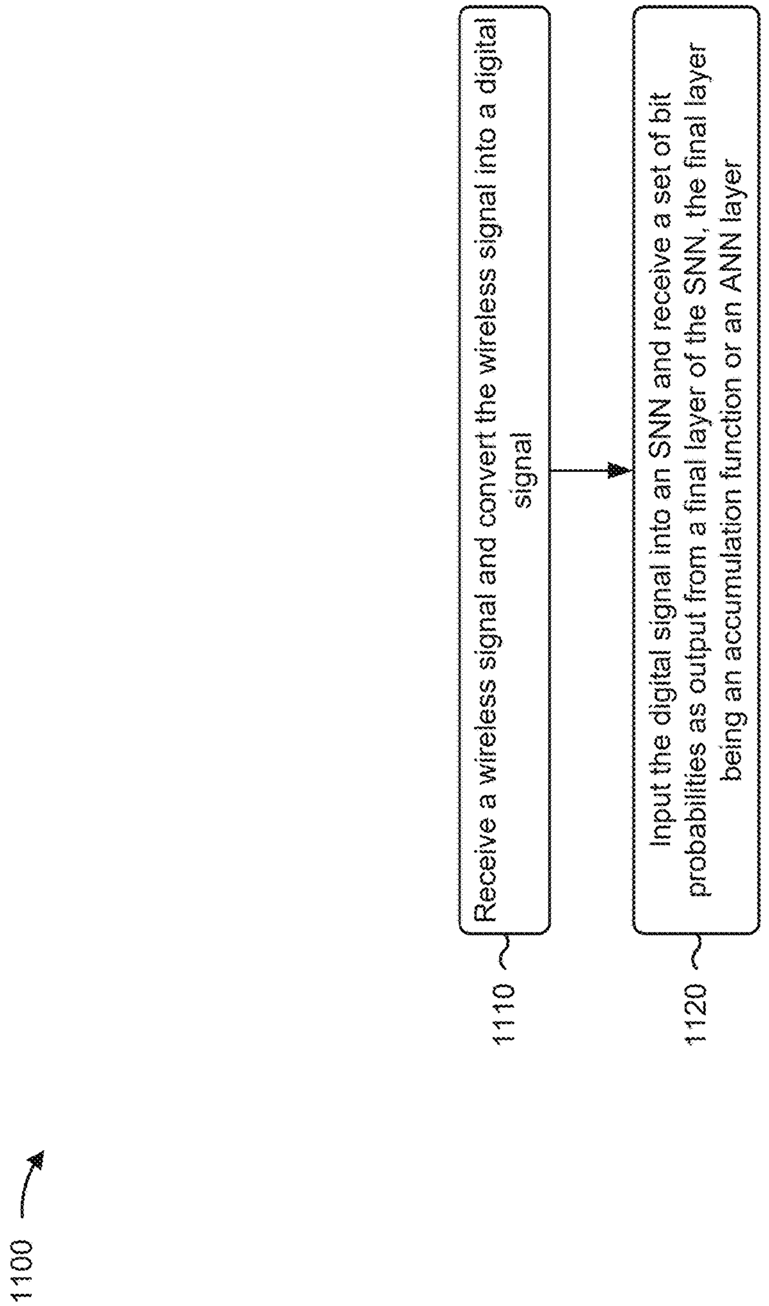

FIG. 11 is a flowchart of an example process 1100 associated with using SNNs for wireless signal decoding. In some implementations, one or more process blocks of FIG. 11 are performed by a wireless signal decoder (e.g., a base station 820 or a UE 830). In some implementations, one or more process blocks of FIG. 11 are performed by another device or a group of devices separate from or including the wireless signal decoder, such as a training system 810. Additionally, or alternatively, one or more process blocks of FIG. 11 may be performed by one or more components of device 900, such as processor 920, memory 930, input component 940, output component 950, and/or communication component 960.

As shown in FIG. 11, process 1100 may include receiving a wireless signal and convert the wireless signal into a digital signal (block 1110). For example, the wireless signal decoder may receive a wireless signal and convert the wireless signal into a digital signal, as described herein.

As further shown in FIG. 11, process 1100 may include inputting the digital signal into an SNN and receiving a set of bit probabilities as output from a final layer of the SNN, the final layer being an accumulation function or an ANN layer (block 1120). For example, the wireless signal decoder may input the digital signal into an SNN and receive a set of bit probabilities as output from a final layer of the SNN, the final layer being an accumulation function or an ANN layer, as described herein.

Process 1100 may include additional implementations, such as any single implementation or any combination of implementations described below and/or in connection with one or more other processes described elsewhere herein.

In a first implementation, process 1100 includes receiving a wireless pilot signal, converting the wireless pilot signal into a digital pilot signal, and inputting the digital pilot signal into the SNN.

In a second implementation, alone or in combination with the first implementation, the final layer includes an accumulation function, and each bit probability, in the set of bit probabilities, includes a soft probability for a corresponding bit.

In a third implementation, alone or in combination with one or more of the first and second implementations, the final layer includes an ANN layer, and each bit probability, in the set of bit probabilities, includes a log likelihood ratio for a corresponding bit.

In a fourth implementation, alone or in combination with one or more of the first through third implementations, the SNN is trained using binary cross-entropy loss.

In a fifth implementation, alone or in combination with one or more of the first through fourth implementations, the digital signal includes a frequency domain signal derived using an FFT.

In a sixth implementation, alone or in combination with one or more of the first through fifth implementations, the SNN includes an input layer, a convolutional layer, a plurality of residual network blocks, and an output layer.

Although FIG. 11 shows example blocks of process 1100, in some implementations, process 1100 includes additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless signal decoder, comprising:

a receiver configured to receive a wireless signal and convert the wireless signal into a digital signal; and at least one processor configured to input the digital signal into a spiking neural network (SNN) and receive a set of bit probabilities as output from a final layer of the SNN, wherein the final layer comprises an accumulation function or an artificial neural network (ANN) layer.

2. The wireless signal decoder of claim 1, wherein the receiver is further configured to receive a wireless pilot signal and convert the wireless pilot signal into a digital pilot signal, and the at least one processor is further configured to input the digital pilot signal into the SNN.

3. The wireless signal decoder of claim 1, wherein the final layer comprises the accumulation function, and each bit probability, in the set of bit probabilities, comprises a soft probability for a corresponding bit.

4. The wireless signal decoder of claim 1, wherein the final layer comprises the ANN layer, and each bit probability, in the set of bit probabilities, comprises a log likelihood ratio for a corresponding bit.

5. The wireless signal decoder of claim 1, wherein the SNN is trained using binary cross-entropy loss.

6. The wireless signal decoder of claim 1, wherein the digital signal comprises a frequency domain signal derived using a fast Fourier transform.

7. The wireless signal decoder of claim 1, wherein the SNN comprises an input layer, a convolutional layer, a plurality of residual network blocks, and an output layer.

* * * * *